United States Patent [19]

Dornier

[11] Patent Number: 5,446,586
[45] Date of Patent: Aug. 29, 1995

[54] SELF-CLEANING MIRROR SYSTEM FOR A MOTOR VEHICLE

[76] Inventor: Irén Dornier, C/Deusto Nr. 20, 28023 Madrid, Spain

[21] Appl. No.: 52,262

[22] Filed: Apr. 23, 1993

[30] Foreign Application Priority Data

Apr. 24, 1992 [DE] Germany .................. 42 13 506.0

[51] Int. Cl.[6] ................... B60S 1/56; B60S 1/46
[52] U.S. Cl. .................. 359/507; 359/839; 15/250.003; 15/250.1; 15/250.3; 15/250.29; 15/250.26; 318/DIG. 2; 318/483
[58] Field of Search ............... 15/250.003, 250.29, 15/250.01, 250.12, 250.26, 250.02, 250.30; 318/DIG. 2, 483; 73/29.01, 29.05, 335.01, 335.02; 340/601, 602, 604; 359/839, 871, 507

[56] References Cited

U.S. PATENT DOCUMENTS

| | | | |
|---|---|---|---|
| 1,561,320 | 11/1925 | Glidric et al. | 15/250.29 |
| 1,719,731 | 7/1929 | Schroder | 15/250.29 |
| 1,832,083 | 11/1931 | Bornstein | 15/250.29 |
| 3,526,920 | 9/1970 | Boyanich | 15/250.003 |
| 3,582,732 | 6/1971 | Kovalsky | 15/250.12 |
| 3,610,781 | 10/1971 | Kolb et al. | 15/250.01 |
| 3,618,156 | 11/1971 | Riggs | 15/250.007 |
| 3,643,145 | 2/1972 | Tann et al. | 15/250.12 |
| 3,649,898 | 3/1972 | Inoue | 15/250.12 |
| 3,855,661 | 12/1974 | Prince | 15/250.01 |
| 4,307,482 | 12/1981 | Palmer | 15/250.003 |
| 4,595,866 | 6/1986 | Fukatsu et al. | 318/483 |
| 4,870,713 | 10/1989 | Raynor | 15/250.003 |
| 4,897,585 | 6/1990 | Millerd et al. | 318/483 |

FOREIGN PATENT DOCUMENTS

| | | | |
|---|---|---|---|
| 3425121 | 1/1986 | Germany . | |
| 3715798 | 1/1988 | Germany | 15/250.12 |
| 3721370 | 1/1988 | Germany . | |
| 29544 | 2/1984 | Japan | 15/250.003 |
| 247153 | 10/1988 | Japan | 15/250.12 |
| 2065459 | 7/1981 | United Kingdom | 15/250.003 |

OTHER PUBLICATIONS

German journal "Kraftfahrzeugtechnik" Aug. 1969.

*Primary Examiner*—Gary K. Graham
*Attorney, Agent, or Firm*—Juettner Pyle Lloyd & Piontek

[57] ABSTRACT

The outside mirror of a motor vehicle is provided with a wiper blade reciprocating on the mirror surface, as well as a liquid spraying means. An LED/photocell unit automatically senses the degree of soiling of the mirror and initiates a wiping cycle when a predetermined light limit is not reached. Irrespective of the degree of soiling, a cleaning operation is initiated after the engine has been started or stopped. The outside mirror is always in a perfect condition in which it offers good visibility to a driver. This considerably increases the road safety of an automotive vehicle.

9 Claims, 5 Drawing Sheets

SELF-CLEANING MIRROR SYSTEM FOR A MOTOR VEHICLE

BACKGROUND OF THE INVENTION

This invention relates to an outside mirror for a motor vehicle comprising a wiper means which includes a liquid spraying means with at least one spraying nozzle on an edge of the mirror casing, as well as a wiper blade which is movable substantially over the whole mirror in an orientation remaining always in parallel with itself.

An outside mirror of a motor vehicle will only fulfill its intended function if it gives the driver a good view of the rear area behind the vehicle, with the area being predetermined by adjustment of the mirror. A good general view of the rear traffic situation, e.g., approaching cars which just start a passing maneuver, is often of decisive importance to safe driving.

When an outside mirror is soiled, misted with moisture or covered with rain drops, it can no longer offer high visibility to a driver toward the rear of the vehicle and sources of danger may remain undiscovered. In critical situations, a driver will try to gain the necessary visibility by turning around so as to be able to look back over his shoulder. This behavior, in turn, entails the risk of a collision. A careful, responsible driver will therefore stop the car and clean the soiled outside mirror by hand. This may possibly be required several times under adverse weather and road conditions.

German patent DE 34 25 121 A1 discloses an outside mirror of the above-mentioned kind. A pneumatic piston/cylinder assembly, which is arranged inside an externally exposed recess of the mirror casing, is provided as a drive means for the wiper blade. The cylinder casing with the wiper blade is moved upwards and downwards by control of a compressed air supply, the cylinder casing being extended beyond the upper edge of the mirror casing. This pneumatic drive means is very troublesome from a technical point of view and subject to failure because the piston/cylinder assembly is exposed to the outside of the mirror, and it may become inoperative, either due to dirt or snow entering into the recess or due to frosting of the piston rod. Moreover, the cylinder casing, which extends beyond the mirror casing, presents a safety risk.

The upper edge of the casing of this known outer mirror has mounted thereon a spraying nozzle for spraying a cleaning liquid onto the mirror casing. Since the wiper blade performs an upward and downward movement, the mirror cannot be cleaned in an efficient way because the wiper blade repeatedly distributes the liquid together with the dirt that has been removed from the mirror surface over the mirror surface during its upward movement.

The cleaning liquid is supplied from a conduit connected to a liquid tank positioned inside the vehicle. It is difficult to connect the outside mirror to the liquid tank because the flexible supply tube must not be exposed to the outside of the vehicle.

German journal "Kraftfahrzeugtechnik" 8/69 discloses a rear-window cleaning process wherein the wiper blade extends over the total height of the rear window and is guided along guide rails in a horizontal direction over the total width of the window. More specific details of the drive means are not disclosed.

German patent DE 37 21 370 A1 discloses an outside rear view window for automotive vehicles including a washing device which only contains spraying nozzles for spraying washing liquid onto the mirror surface. The outside rear view window is not equipped with a wiper and drive means, so that the mirror surface cannot be cleaned in an efficient way.

German patent DE 37 15 798 A1 deals with an opto-electronic device for sensing dirt on transparent protective panes and for initiating cleaning measures, such as the front panes of vehicles and ships as well as protective panes in industrial plants.

SUMMARY OF THE INVENTION

It is the object of the present invention to provide a self-cleaning outside mirror in which the above-mentioned drawbacks of the prior art are overcome. In particular, the outside mirror is to be of a simplified structure and is to fulfill its function in a more reliable and efficient manner.

In accordance with the present invention, the drive device for the wiper blade is accommodated behind the mirror surface inside the mirror casing. The wiper blade is connected to a support which is displaceably guided behind the mirror surface. At least one conventional rotating electric motor is provided for driving the support.

The wiper blade is arranged substantially at a right angle relative to the upper edge on which the spraying nozzles are arranged, so that the direction of movement of the wiper blade is in parallel with said edge. To this effect, the wiper blade can clean the mirror surface very efficiently because it distributes the cleaning liquid over the full width of the mirror surface, thereby pushing it away laterally, so that the cleaning liquid can flow off downwards by gravity on the edge. The spraying nozzles are preferably positioned on the upper edge of the mirror casing, and the wiper blade is preferably supported vertically.

A liquid tank is located in the mirror casing behind the drive means, thereby overcoming the problems arising from the accommodation of a connection tube leading a tank in the vehicle.

The inventive outside mirror is, on the whole, of a considerably simplified structure and can fulfill its function in a highly efficient manner.

The inventive outside mirror is well suited for passenger cars and especially on trucks, where the soiling of the outside mirror becomes is typically a more serious problem. The self-cleaning outside mirror of the invention may be mounted on both sides of the vehicle.

The wiper blade is preferably connected to a spring clamp which is convexly bulged outwards in its relaxed state and has the profile of a circular arc, with a plurality of evenly spaced-apart elastic arcuate supports being interposed between the clamp and blade. A substantially uniform contact pressure of the wiper blade with the mirror surface is thereby created in which the spring clamp is oriented in a substantially straight line. The spring clamp preferably consists of spring steel, and it has been found most expedient to provide four arcuate holding means or supports for the wiper blade.

The blade support may have secured thereto its drive means which engages with a worm gear meshed with stationarily mounted threaded spindle arranged at a right angle relative to the support and extending substantially over the total width of the mirror. The drive means may be a motor whose running direction is reversed at the end of a wiping cycle, which can be established by appropriately arranged electric contacts. If desired, two motors may be mounted on both sides of the threaded spindle to engage worm gears and the stationary threaded spindle, said motors being operated to drive the blade in the same direction. The stationarily mounted threaded spindle is expediently located substantially in the middle of the support.

In a second embodiment, the threaded spindle is rotatably supported in the casing and reversibly driven by an electric reversing motor. In this embodiment the support is secured to a nut which is in threaded engagement with the threaded spindle. The nut and thus the support are moved along the threaded spindle by rotating the threaded spindle. The electric reversing motor is stationarily mounted on the inner wall of the mirror casing.

To ensure parallel guiding of the support, a guide rail may be arranged on both sides of the threaded spindle in parallel therewith. These rails are preferably positioned in the two end portions of the support and inwardly mounted on the mirror casing.

To minimize frictional forces during the reciprocating movement of the support, the support is preferably provided with rollers which rest on the opposed lateral surfaces and preferably also on an edge of the rails which face away from the mirror. This ensures that the support is always held in parallel with the mirror surface.

The liquid spraying means may comprise a plurality of spraying nozzles which are connected to at least one liquid source and to a pump. It is within the scope of the present invention that some of the spraying nozzles communicate with a liquid source of a standard cleaning liquid while other spraying nozzles are connected to another liquid source which contains a more concentrated cleaning liquid to better penetrate and remove tenacious dirt from the mirror surface. If two different sources of liquid are provided, they may be connected by a pump to the associated spraying nozzles.

The spraying nozzles are preferably arranged on an upper edge of the mirror casing which projects beyond the mirror surface. The spraying nozzles are expediently directed at an acute angle towards the mirror surface. It is of course within the scope of the invention to arrange the spraying nozzles on the lateral edges and on the lower edge of the mirror casing.

The drive motor (or motors) may be provided with a pump segment. This results in a simple space-saving assembly which can readily be accommodated inside the cavity of mirror casing behind the mirror. The pump segment is connected in a suitable way to the source of liquid and the associated spraying nozzles, preferably by flexible tubes of sufficient length.

Preferably, the liquid tank within the mirror casing is provided with a filler opening extending through the rear wall of the mirror casing, to facilitate filling of the tank. The liquid may comprise a concentrated cleaning liquid.

The mirror may be provided with a sensing means for automatically sensing the degree of soiling of the mirror surface and for starting the wiper means when a predetermined limit value is reached. For example, the sensor may initiate a spraying action and a reciprocating movement of the wiper blade for several cycles. The sensing means is preferably an optical means which may include at least one light-emitting diode and photocell unit. The light-emitting diode is arranged opposite to the photocell and emits light which impinges on the mirror and reaches the photocell. When the light value received by the photocell falls short of a predetermined limit value, the photocell supplies a signal to a control means which causes operation of the sprayers and wiper for a number of cycles.

There may also be provided two or more LED and photocell units whose values can be averaged by an evaluation means which is connected to the control means. The automatically initiated cleaning operation includes, for instance, six wiping cycles, i.e., six reciprocating movements of the wiper blade, with the spraying means being operated as well.

Automatic cleaning of the mirror ensures that the mirror is always in a perfect condition, providing an excellent reflected view from the rear of the vehicle. The driver need not devote attention to the state of the outside mirror of the vehicle because any kind of soiling detrimental to perfect visibility will be eliminated automatically and immediately.

The optical sensing means may be designed such that the light-emitting diode is arranged opposite to the outer surface of the mirror and directs its light through a transparent region of the mirror onto a photocell arranged behind the mirror. This transparent region may be a small, semi-metallized, and preferably circular mirror section which passes a predetermined amount of light because of the reduced metallization, but nevertheless produces a mirror effect for the driver. Also, the light-emitting diode may be secured to an arm mounted on the frame of the mirror casing or on the spring clamp, while the photocell is positioned behind the mirror.

In an alternative embodiment of the invention, the light-emitting diode or a plurality of light-emitting diodes may be arranged on a protruding edge of the mirror casing and direct light obliquely onto the mirror surface to be reflected onto photocells arranged on the opposite edge of the mirror casing.

In all of the above cases the foreign material on the mirror surface reduces the amount of reflected light or the amount of light passing through the mirror, so that the light intensity received by the photocell is an objective measure of the degree of soiling of the mirror surface.

The control means may be employed to start the wiper means automatically as soon as the engine of the vehicle is started. This process is performed independently of the state of soiling measured by the sensing means, to ensure that the outside mirror is entirely clean at the beginning of a ride.

After a ride has been ended, i.e. after the engine has been turned off, the control means may cause a predetermined number of wiping cycles automatically to free the mirror from all foreign matter. The spraying operation, can then be carried out with a separate, more efficient cleaning agent which may remain on the mirror surface until the beginning of the next ride.

The mirror may also be provided with a heating means which optionally defrosts the mirror surface and is capable of quickly drying a wet mirror. A heating coil, which is connected to a source of current, such as the car battery, may be provided, e.g., printed on the rear side of the mirror. The heating coil may be operated by a signal initiated by the driver, a switch.

The inventive outside mirror increases the road safety of an automotive vehicle because it permits an always perfect view. Impurities which occur during a ride can immediately be eliminated without stopping the vehicle. The mirror is automatically cleaned with the aid of the sensing means, which may be adjustable. The outside mirror can have a pleasant, aerodynamically advantageous shape because the wiper means is easily accommodated inside the mirror casing.

Other features, advantages and details of the invention will become apparent from the following description of a preferred embodiment and from the drawing, in which:

THE DRAWINGS

DESCRIPTION OF THE PREFERRED EMBODIMENTS

The figures illustrate the essential parts of the inventive outside mirror in a substantially diagrammatic way.

Figure 1:
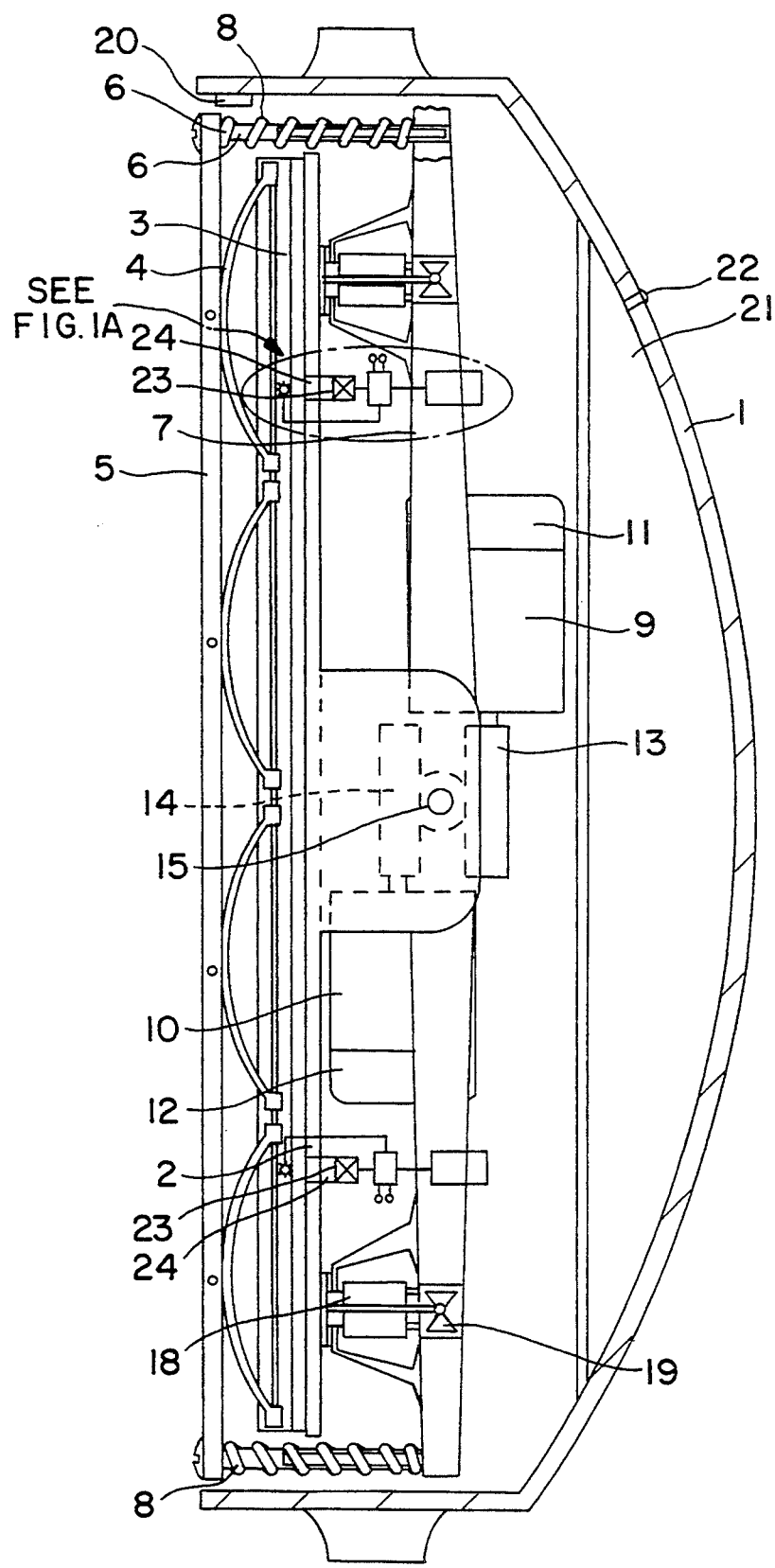
FIG. 1 is a vertical section through an outside rear view mirror of the invention.
Figure 1A:
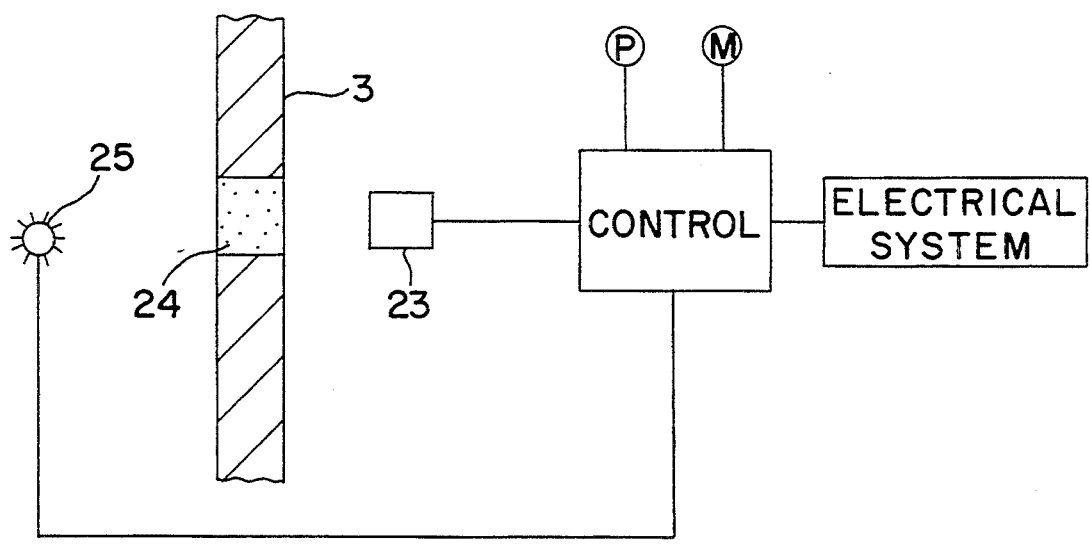
FIG. 1A is a schematic of the circled portion of FIG. 1 showing the connection between the control and operating components.
Figure 2:
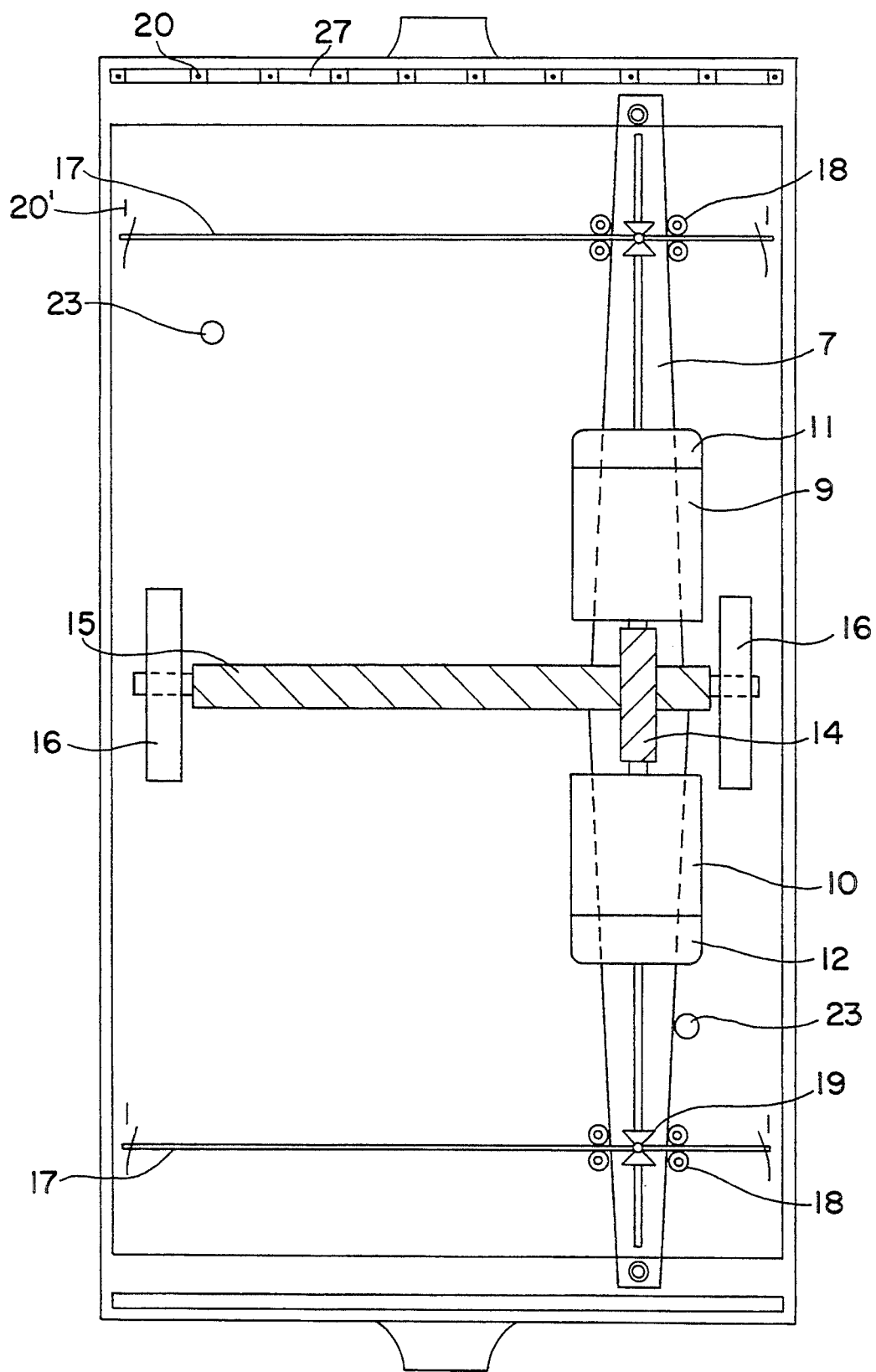
FIG. 2 is a view of the mirror casing with the wiper parts arranged therein.

Reference is first of all made to FIGS. 1 and 2. The outside mirror of the invention comprises a conventionally shaped mirror casing 1 to which a mirror 2 is secured in such a way (not shown in more detail) that an edge of the mirror casing projects beyond mirror 2.

The mirror surface has positioned thereon a wiper blade 3 which is connected via four elastic, evenly spaced-apart arcuate holding means or supports 4 to a spring steel clamp 5 which, in turn, is mounted in two end regions on an inner support 7 by means of a screw 6.

Support 7 is positioned behind mirror 2 and extends in parallel with wiper blade 2 and spring steel clamp 5, respectively. A compression spring 8 is respectively positioned on both screws 6.

Support 7 has mounted thereon two motors 9 and 10 that are each equipped with a pump segment 11 and 12 and are in engagement—through a worm gear 13 and 14—with a threaded spindle 15 which is stationarily secured within mirror casing 1. As illustrated in FIG. 2, the ends of the threaded spindle 15 are secured with the aid of brackets 16 inside mirror casing 1.

A pair of fixed parallel support rails 17 are provided for guiding the support 7 along parallel lines in a plane. Side rollers 18 are mounted on the support and engage the opposite sides of the rails. An upper roller 19 is mounted on the support and engages the top surface of the rail. Electrical switch contacts 20' are mounted at the ends of the rails 17.

A channel 27 comprising a plurality of evenly spaced-apart spraying nozzles 20 that are obliquely directed towards the outer surface of mirror 2 is positioned on the inner upper edge of mirror casing 1. The spraying nozzles 20 are connected through flexible tubes (not shown) to the outlets of pump segments 11 and 12 and the inlets of the pumps are connected to two liquid tanks, of which one is mounted at 21 inside mirror casing 1. The tank 21 is filled with a concentrated cleaning agent through a sealable opening 22. The other tank is referably located at a suitable place in the associated automotive vehicle. Only one tank 21 is provided in a preferred embodiment.

Two photocells 23 are mounted behind mirror 2, i.e., behind a mirror area 24 which is only partly metallized and thus at least partially transparent. Two light-emitting diodes 25 that are, e.g., secured by means of clips 26 to the frame of mirror casing 1 are arranged opposite to photocells 23 on the outside of mirror 2 and the only partly metal-coated surfaces 24. The light-emitting diodes may also be arranged at another place and in a different way, e.g., on spring clamp 5 or directly on the edge of mirror casing 1. In this case photocells 23 may also be arranged on the opposite edge at the same side of mirror 2 and then receive the light reflected from the mirror surface.

If photocells 23 receive a light intensity value which is below a given limit value, this initiates an automatic cleaning process in which a cleaning liquid is discharged from spraying nozzles 20 onto the mirror surface and support 7 is reciprocated along rails 17, with wiper blade 3 cleaning the mirror surface. Motors 9 and 10 drive the wiper means in a particular direction, the electric contacts 20' performing the switching operation and reversal of motion at the end of each cycle. Each cleaning process which is initiated by sensing preferably includes six wiping cycles.

Suitable and convention control circuitry are employed to control the operation of the motors and the pumps. The control receives a signal from the photocells to switch on the electric pumps and the motors for given periods of time. The contacts 20' serve to reverse the rotary output of the motor. Thus, the control, connected to between the battery and the motors and pumps, and receiving signals from the photocells, serves to perform a cleaning sequence in an automatic fashion.

When the motor is started, the circuitry is arranged such an automatic cleaning process of four cycles is initiated independently of the state of soiling of the mirror. Furthermore, an individual wiper cycle is automatically started after the motor has been switched off, whereupon concentrated cleaning liquid is sprayed from tank 21 onto the mirror surface, with the liquid remaining on said surface.

Figure 3:
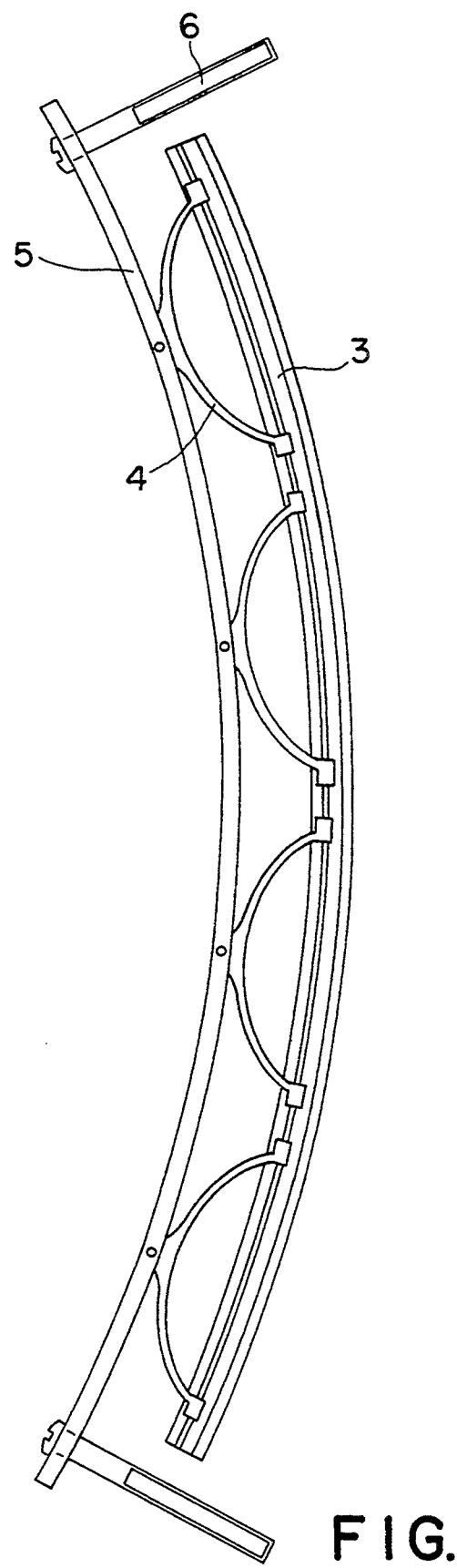
FIG. 3 is a side view of the spring clamp for holding the wiper blade, the clamp being here in its released state.

As becomes apparent from FIG. 3, the spring steel clamp 5 which carries the wiper blade is curved in the fashion of a circular arc in the untensioned state, i.e., in the state in which it is not installed. When the wiper means is mounted, with the blade against the mirror, the spring clamp 5 is oriented in a straight line, which has the effect that the holding means 4 press the wiper blade 3 with a uniform force against the mirror surface.

Figure 4:
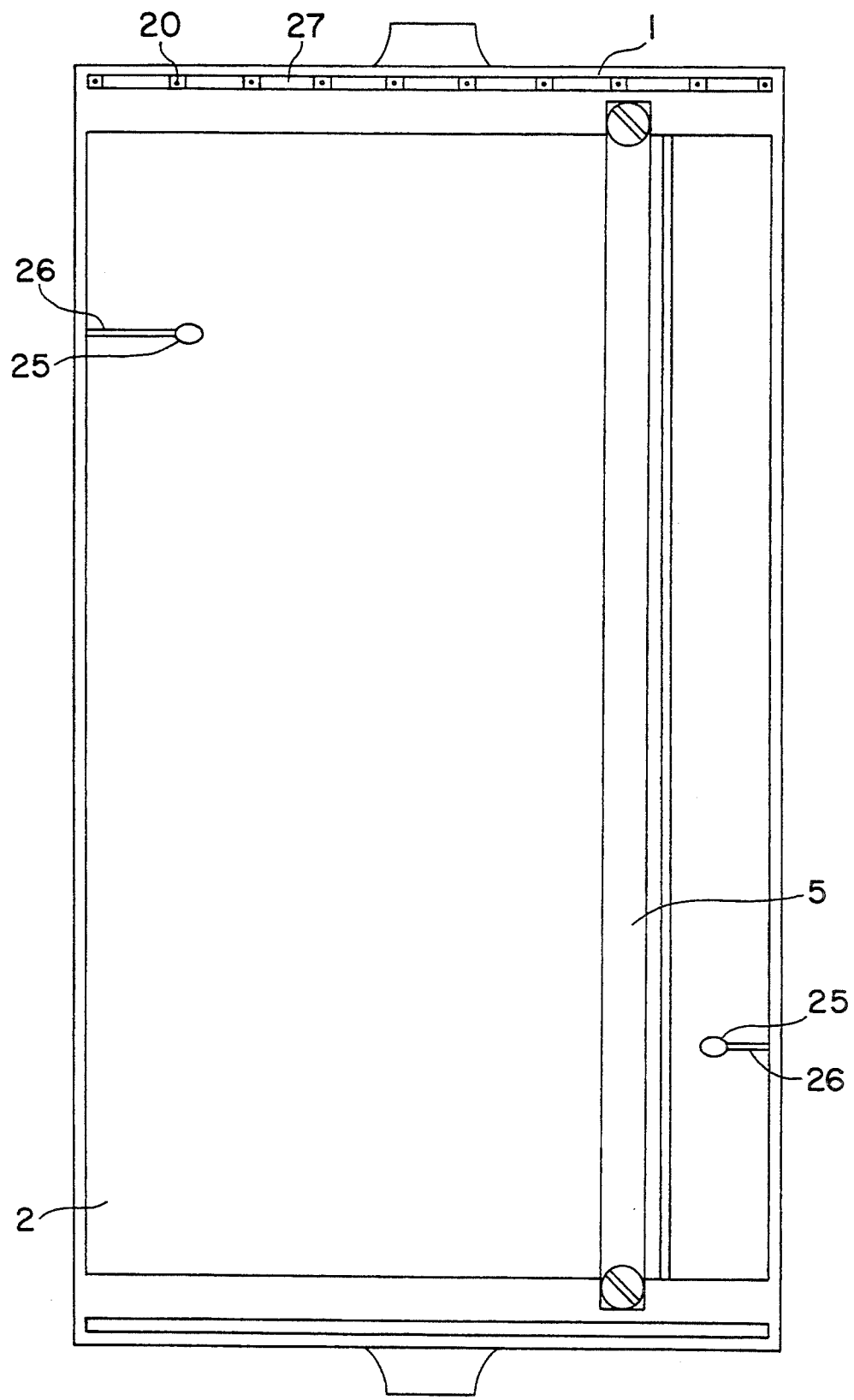
FIG. 4 is a front view of the outside mirror of the invention.

As becomes apparent from FIG. 4, the wiper means as well as the light-emitting diodes do virtually not impair the visibility offered by the mirror. The initial or inoperative position of the spring steel clamp 5 and of the wiper blade 3, respectively, may also be on the edge of mirror 2 at the very right side, in contrast to the illustration of FIG. 4.

It is within the scope of the invention that the sensing means may additionally comprise a small additional mirror with the aid of which the rays of light emitted from the light source can be diverted towards the photocell. The additional mirror may be secured to the spring steel clamp and the light of a light-emitting diode secured to an edge of the mirror casing may be directed through an only partly metallized section onto a photocell arranged behind the mirror. During movement of the wiper blade for cleaning the additional mirror, the latter possibly sweeps over a small wiper surface for cleaning the same, and may additionally be cleaned by a cleaning liquid supplied from a spraying nozzle. The light sources can be kept clean in this way.

I claim:

1. A cleaning system for an outside mirror system of a motor vehicle, said system comprising a mirror having a reflective surface, a hollow casing surrounding and supporting said mirror, said hollow casing having a top edge, an elongated wiper blade in wiping engagement with the reflective surface of said mirror, said wiper blade being oriented perpendicular to the top edge of said casing, liquid spray means mounted on said top edge for spraying cleaning liquid toward the reflective surface of said mirror, a support reciprocally mounted for movement within said casing behind said mirror and connected to said wiper blade, drive means for driving said support and wiper blade in a reciprocal fashion, and sensing means for sensing the amount of foreign material on said mirror, said sensing means comprising a transparent region through the reflective surface of said mirror, a light source outside the casing directed toward said transparent region into said casing, and a photocell means mounted within said casing for measuring the intensity of light from said source through said transparent region.

2. The cleaning system of claim 1 wherein said drive means comprises an elongate spindle mounted in said casing, a drive gear engaged on said spindle and connected to said support, and a motor in driving engagement with said drive gear.

3. The cleaning system of claim 2 wherein said motor is mounted on said support.

4. The cleaning system of claim 2 wherein said liquid spray means comprises a pump connected to said motor and driven thereby, said pump being connected to said liquid spray means.

5. The cleaning system of claim 1 additionally comprising a liquid supply tank within said hollow casing, said liquid supply tank being connected to said liquid spray means.

6. The cleaning system of claim 1 additionally comprising a pair of spaced guide rail means within said hollow casing for guiding said support.

7. The cleaning system of claim 6 wherein said support has rollers engaging said guide rail means.

8. The cleaning system of claim 1 additionally comprising a support arm connected to said wiper blade, said arm having ends, said ends being connected to said support.

9. The cleaning system of claim 2 wherein a plurality of arcuate wiper blade supports are connected between said support arm and said wiper blade.

* * * * *